Dec. 10, 1929.   M. T. GEYSER   1,738,770
FLEXIBLE TAIL LIGHT FOR VEHICLES
Filed Jan. 5, 1928
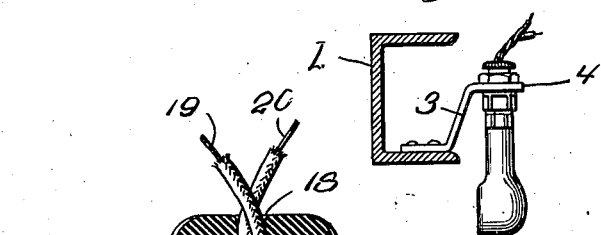
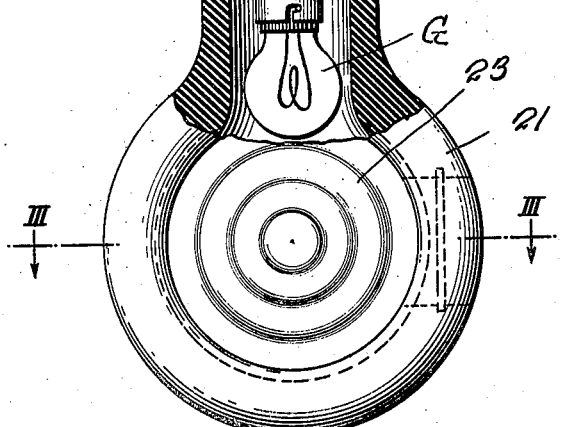
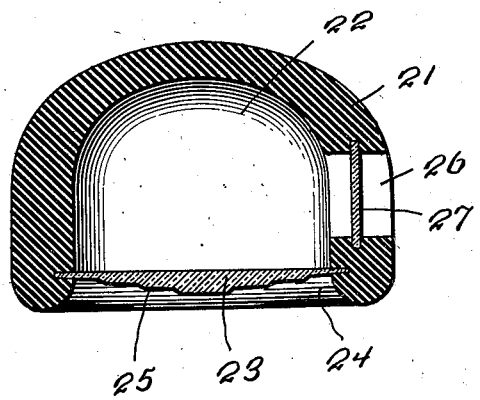
INVENTOR.
Mathilde T. Geyser
ATTORNEY Patented Dec. 10, 1929

1,738,770

UNITED STATES PATENT OFFICE

MATHILDE T. GEYSER, OF NEW YORK, N. Y.

FLEXIBLE TAIL LIGHT FOR VEHICLES

Application filed January 5, 1928. Serial No. 244,678.

This invention relates to flexible tail lights for vehicles, being in the nature of an improvement upon the structure shown and described in the pending application Serial No. 218,197, filed September 8th, 1927.

An object of the present improvement is to simplify and render more practical and efficient the structure illustrated in said pending application.

A more specific object is to provide improved and simplified means of supporting and giving access to the electric light bulb employed.

A further specific object is to provide for the easy adjustment of the bulb with respect to the bull's-eye opening of the device.

A further specific object is to provide improved means of attaching the device to the vehicle.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a transverse sectional view through a frame portion of a vehicle showing the improved tail light connected in operative position thereto.

Fig. 2 is an enlarged vertical sectional view, partly in elevation, of the tail light structure seen in Fig. 1, and Fig. 3 is a horizontal sectional view taken upon the plane of line III—III of Fig. 2.

The exemplary structure illustrated in the drawings includes the vehicle cross beam or other similar member as L to which the tail light is connected in the same manner as in the previous application. This cross beam is of channel shape such as is customary in truck structure, having a lower horizontal flange 2 which affords a convenient part to which to attach the tail light as by means of a bracket 3 bolted or otherwise rigidly connected with said flange. This bracket provides a relatively elevated portion as 4 having an aperture as 5 therethrough through which is fitted the upper end or attachment part of the tail light.

The attachment part illustrated consists of an outer collar 6 and an inner collar 7 threaded into the outer collar and said collars having opposing shoulder parts as 8 and 9 respectively arranged to clamp against the opposite surfaces of the portion 4 of the bracket, the inner collar 7 extending through the aperture 5 to reach the collar 6 which is beneath the portion 4.

The collar 6 has an inturned bottom flange 10 over which engages an outturned annular flange 11 of a metallic sleeve 12 which extends through the collar 6 and continues downwardly into the upper end part of the flexible neck portion 13 of the tail light, there being a clamp band as 14 encircling the neck portion 13 to clamp it rigidly against the outer surface of the sleeve 12.

The collar 7 is preferably of a size so that when its shoulder part 9 clamps against the upper surface of the bracket 3 its lower end surface as 15 will at the same time press against the upper surface of the flange 11 so as thus to at once hold the device connected firmly with the bracket 3 and hold the sleeve 12 connected firmly with the collar 6.

The collar 7 has an interiorly threaded bore 16 into which is fitted an insulating plug 17. This plug is preferably of elastic insulating material such as soft rubber and it has an opening as 18 longitudinally centrally therefor the passage of the two insulated conductor wires as 19 and 20 which are led downwardly through said opening to the lamp G. The opening 18 is intended to be of a size to snugly engage the conductors, but to normally permit frictional sliding adjustment of the conductors longitudinally through the opening. And it is further intended that as the plug is screwed downwardly into the bore 16 of the collar 7 the plug will be compressed to such an extent as to grip with sufficient tightness against the conductors to firmly and immovably support the conductors, and hence the lamp. The lamp has no other support than the conductors, it being merely suspended loosely within the hollow of the neck 13 by means of said conductors and being, by reason of the structure just described, readily adjustable to any point longitudinally of said neck as may be desired prior to the screwing in of the plug 17.

Rough adjustment may be effected by sliding the conductors longitudinally of the opening 18 before screwing down the plug, and fine adjustment may be effected by screwing down the plug to a greater or less extent according to desire.

The opening through the sleeve 12 and through the collar 7 is sufficiently large so that the lamp may be lifted out of the neck at any time by simply unscrewing and lifting away the plug 17. A new lamp may be attached, or any necessary repairs made, or the conductors may be adjusted longitudinally of the plug, and the lamp again returned to its operative position without disturbing any of the other parts of the device.

At the lower end of the neck 13 is provided a bull's-eye portion 21. This may be connected with the neck portion in any suitable manner but preferably is formed integrally with the neck portion both being of soft resilient material such as moulded rubber or the like. The portion 21 has a hollow interior as at 22 into which the hollow of the neck 13 communicates uninterruptedly, the lamp G being usually arranged approximately at the juncture of the neck and said portion 21 so that while the lamp is not directly within the hollow 22 its rays will flood said hollow and thereby illuminate the lens or other transparent element 23 which forms a closure for the bull's-eye opening 24 of said hollow and which is preferably provided with such surface configurations as at 25, as is calculated to defuse the light rays and give the appearance of a large and fully illuminated surface whenever the lamp is burning.

The walls of the bull's-eye portion 21 are made quite thick and are relatively thicker than the walls of the neck 13 so that while a blow struck against the bull's-eye portion may to some extent flex the walls thereof the major flexing will occur in the relatively lighter neck part 13, the bull's-eye portion merely yielding under the blow as a body and returning again to a normal position, the neck portion serving as a sort of spring to permit the yielding and to then cause the return of the bull's-eye portion when the force of the blow has been spent.

A side opening as 26 may be provided in the bull's-eye portion closed by a transparent element 27 which, like the transparent element 23 in the opening 24, is preferably of a soft and yielding material such as celluloid or the like so that it will not be likely to be injured by such slight flexing as it may be subjected to when struck.

It will be seen that the structure thus described is efficient, strong and durable. Severe shocks may be imposed upon the bull's-eye portion which depends below the vehicle member 2 without causing injury to any part of the device. The element G is suspended loosely within the device by means of the flexible conductors. It is free to move, or swing, about laterally to a limited extent determined by its size relative to the interior diameter of the device. The walls with which it moves into contact however are soft and resilient so that no injury will occur to the lamp. And by placing the lamp in what is considered its most desirable position, namely at approximately the juncture between the neck and the bull's-eye portion, as illustrated in Fig. 2, the great bulk of wall forming material at this point will almost always prevent any appreciable collapse of the walls against the lamp, as will be readily understood.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A tail light structure comprising an attachment portion, a portion having a light displaying window opening therethrough, a flexible portion extending between and connecting the second mentioned portion with said attachment portion, a lamp arranged to illuminate said window being free of all of said mentioned portions, and flexible conductors for said lamp constituting the sole support for said lamp.

2. A tail light structure comprising an attachment portion, a portion having a light displaying window opening therethrough, a flexible portion extending between and connecting the second mentioned portion with said attachment portion, a lamp arranged to illuminate said window being free of all of said mentioned portions, and electrical connections for the lamp providing the sole support of the lamp and comprising a pair of flexible conductors for the lamp depending from a point of attachment and having the lamp suspended at their lower ends.

3. A tail light structure comprising an attachment part, a portion having a light displaying window opening therethrough, a hollow flexible tubular portion extending between and connecting the second mentioned portion with said attachment part, a lamp arranged to illuminate said window, and a pair of flexible conductors for the lamp mechanically connected at one point with said attachment part, said conductors depending from said attachment part through said tubular portion and being connected by their lower ends to said lamp to constitute the sole means of supporting the lamp from the attachment part.

4. A tail light structure comprising an attachment part, a portion having a light displaying window opening therethrough, a flexible portion extending between and connecting the second mentioned portion with said attachment part, a lamp arranged to illuminate said window, and flexible conductors for said lamp constituting the sole means by which the lamp is supported adjacent the window, together with attaching means for the conductors of a character permitting adjustment of the conductors with respect thereto and hence of the lamp with respect to said window.

5. A tail light structure comprising an attachment part, a portion having a light displaying window opening therethrough, a flexible portion extending between and connecting the second mentioned portion with said attachment part, a lamp arranged to illuminate said window, and flexible conductors for said lamp, means whereby to effect relatively rough adjustment of the lamp with respect to said window, and other means whereby to effect relatively finer adjustment of the lamp with respect to said window.

6. A tail light structure comprising an attachment part, a portion having a light displaying window opening therethrough, a flexible portion extending between and connecting the second mentioned portion with said attachment part, a lamp arranged to illuminate said window, conductors for said lamp constituting the sole support for said lamp, and means whereby said conductors are supported comprising a member through which the conductors extend, said member being compressible to grip the conductors, together with means whereby said member may be compressed.

7. A tail light structure comprising an attachment part, a portion having a light displaying window opening therethrough, a flexible portion extending between and connecting the second mentioned portion with said attachment part, a lamp arranged to illuminate said window, conductors for said lamp constituting the sole support for said lamp, and means whereby said conductors are supported having an opening through which the conductors are slidably vertically adjustable to thereby provide for a relatively rough adjustment of the lamp with respect to said window, said member being of compressible material and being adapted when compressed to grip the conductors for holding them in any adjusted position, together with means whereby to at once compress said member and effect relatively finer adjustment of the lamp with respect to the window.

8. A tail light comprising a bull's-eye portion, a flexible neck portion to the lower end of which the bull's-eye portion is connected, said mentioned portions being hollow and there being a window in the bull's-eye portion, a lamp, a flexible support for the lamp depending from a point of attachment downwardly through the neck portion adapted to hold the lamp in a position for illuminating said window, and means for attaching the neck portion to a suitable support comprising a part serving also as a point of attachment for said flexible support.

9. A tail light comprising a bull's-eye portion, a flexible neck portion to the lower end of which the bull's-eye portion is connected, said mentioned portions being hollow, and there being a window in the bull's-eye portion, a lamp, a flexible support for the lamp depending from a point of attachment downwardly through the neck portion adapted to hold the lamp in a position for illuminating said window, and means for attaching the neck portion to a suitable support comprising an internally threaded collar connected to the upper end of said neck having an upwardly facing shoulder for engaging the under surface of the support, a second collar exteriorly threaded to extend through an opening in the support into engagement with the threads of the first collar and having a downwardly facing shoulder to engage the upper surface of the support and thereby cooperate with the first collar to clamp the neck upon the support, and said second collar having an opening therethrough through which the flexible support extends and within which said flexible support is attached.

10. A tail light comprising a lamp, means providing an enclosure within which the lamp is disposed said means having a window opening, flexible means for supporting the lamp within said enclosure permitting movement of the lamp in all lateral directions against the walls of the enclosure, and the walls of said enclosure likely to be struck by the moving lamp being of yieldable material.

In testimony whereof I affix my signature.

MATHILDE T. GEYSER.